United States Patent Office 2,870,025
Patented Jan. 20, 1959

2,870,025

PREVENTING STRUVITE FORMATION IN THERMALLY TREATED SEAFOODS

Carl R. Fellers, Amherst, Mass., and Walter A. Zachowski, Beaufort, S. C., assignors to Blue Channel Corporation, Port Royal, S. C., a corporation of Maryland No Drawing. Application April 24, 1957
Serial No. 654,666

6 Claims. (Cl. 99—188)

This invention relates to improvements in the thermal treatment of seafoods, which are subject to the accumulation of struvite crystals on their surfaces or in their tissues after processing, and includes an improved method for preventing the formation of struvite in thermally treated seafoods and the resulting improved products.

More particularly, the invention relates to improvements in the canning of seafoods, which tend to form objectionable struvite crystals on thermal treatment and canning, such as shrimp, crayfish, lobsters, certain crabs such as the King and Dungeness crabs of the Pacific Ocean, and certain fish such as tuna, bonita, salmon, the cod family and others.

Chemically, struvite is a crystalline chemical compound of the composition $Mg(NH_4)PO_4 \cdot 6H_2O$, named magnesium ammonium phosphate. The elements which constitute struvite are normally present in the flesh of crustacea and fish but they do not combine to form the objectionable, hard, gritty struvite crystals until after the meat has been thermally processed. The crystals are sometimes mistaken by the consumer for glass particles. Their presence greatly lowers the acceptability of seafoods containing them.

The formation of struvite in canned seafoods is not universal, and certain seafoods, such as the blue, sand and rock crabs of the Atlantic Coast, are free from objectionable tendencies toward struvite formation. But other types of crabmeat, such as the Dungeness and King crabs of the Pacific Coast, and other types of seafood such as those above mentioned, have a tendency to form struvite crystals, particularly on long standing in the cans after thermal treatment during canning. The presence of large struvite crystals is highly objectionable because of their glassy nature, which may cut the mouth or break the teeth or give a gritty effect when chewed. The presence of such large crystals of struvite presents a health hazard and a serious defect in certain canned seafoods.

The present invention provides an improved process for preventing the formation of large and objectionable struvite crystals from thermally processed seafoods and is based on the discovery that the addition of a small and regulated amount of aluminum sulfate to the seafood when canned and subjected to thermal treatment will prevent struvite formation; and, where the amount of aluminum sulfate added is not sufficient to completely inhibit crystal formation, will result in the formation of crystals so small as to be unobjectionable and detachable only by careful examination, as by a microscope.

The amount of aluminum sulfate, which is added to the can and present during the canning and thermal treatment of the seafood, will vary somewhat with different seafoods and also will vary with the elapsed time between the catching of the seafood and its final processing, increasing with the elapsed time.

In general, the amount of aluminum sulfate, which is adequate to control and prevent the formation of objectionable struvite crystals is from about 0.025 to about 0.2% by weight of aluminum sulfate $Al_2(SO_4)_3 \cdot 18H_2O$ based on the weight of the seafood and brine contained in the can. This represents from about 250 to 2000 parts per million of the crystalline aluminium sulfate based on the contents of the can, including seafood plus brine; or from about 50 to about 400 milligrams of the crystalline aluminum sulfate $Al_2(SO_4)_3 \cdot 18H_2O$ per standard 200-gram can containing e. g. 128 grams of solid shrimp and 72 grams of brine. An advantageous amount in most cases is around 0.1% or somewhat less, or 200 milligrams of the crystalline aluminum sulfate per 200-gram can, containing 200 grams of e. g. shrimp plus brine. Shrimp are commonly subjected to blanching in hot salt brine before being packed in cans.

As an example illustratnig the process of the invention in the canning of shrimp, with the commonly used 307 x 113 size tin cans containing 200 grams of shrimp and brine of which approximately 128 grams are solid shrimp, 200 milligrams of the crystalline aluminum sulfate are added per can, representing 0.1% of the total can contents or 1000 parts per million based on the total can contents.

One method of carrying out the process is to add the solid shrimp to the can, then fill the can with cold fresh water or brine containing the aluminum sulfate and sealing the can under a vacuum. Another method is to add hot fresh water or brine containing the aluminum sulfate at a temperature of around 180° F. to 190° F., after the shrimp has been placed in the can, and sealing the can, after it has been filled with the hot fresh water or brine. In either method of procedure, a satisfactory vacuum is obtained and most of the enclosed air is removed.

Instead of adding the aluminum sulfate to the brine when brine is desired to be added to the can, the process can advantageously be carried out by combining the aluminum sulfate in a salt tablet and adding the salt tablet to the can before the solid shrimp or other seafood is added, and then adding fresh water to fill the can, so that both the salt and the aluminum sulfate will be dissolved to form a brine containing the aluminum sulfate.

These salt tablets can be prepared in the form of e. g. a 75-grain salt tablet (4.86 grams) containing 200 milligrams of the crystalline aluminum sulfate. And such tablet can be added to the can before the shrimp is added and with further addition of water to fill the can. And one tablet will be used for a 200-gram tin can containing 200 grams of shrimp plus brine and around 128 grams of solid shrimp. The resulting can will contain e. g. 128 grams of solid shrimp and 72 grams of brine resulting from the dissolving of the salt tablet and containing 200 milligrams of the crystalline aluminum sulfate.

Another method is to add a tablet of aluminum sulfate to the can before the solid shrimp or seafood is added and then add the shrimp and fresh water to fill the can so that the aluminum sulfate tablet will be dissolved to form a liquid containing the aluminum sulfate. The aluminum sulfate tablet can be prepared by using 200 milligrams of the crystalline aluminum sulfate. One tablet will be used for a 200-gram can containing 200 grams of shrimp and water of which 128 grams are solid shrimp. The resultant will contain, e. g., 128 grams of solid shrimp and have 72 grams of slightly briny water, containing 200 milligrams of the crystalline aluminum sulfate resulting from the dissolving of the aluminum sulfate tablet.

Where the aluminum sulfate is dissolved in fresh water or brine before either is added to the can, the amount of crystalline aluminum sulfate in the fresh water or brine can be similar to that above indicated, e. g., 200 milligrams of the crystalline aluminum sulfate to 72 grams of fresh water or brine added to a can containing 128 grams of solid shrimp.

In canning raw shrimp, the shrimp are first blanched in a hot brine of about 27° salometer reading, and thereafter are usually cooled before they are placed in the cans. As indicated above, aluminum sulfate is added to the can either in solution or as a loose powder or as a tablet combined with salt, or as a tablet without salt or with other filler. The liquor in the can, when hot or cold water is added to dissolve the aluminum sulfate, without any added salt, will contain some of the salt retained by the blanched shrimp, and the liquor in the can after sealing and sterilizing will be slightly briny, and is referred to as a brine, as well as the solution formed when salt is also added.

The present process is an advantageous process for the prevention of struvite in various canned seafoods, including not only shrimp but other seafoods such as tuna, lobster and crayfish (spiny lobster or rock lobster), Dungeness and King crabs from the Pacific Ocean, and fish such as bonita, salmon, and the cod family, where struvite formation tends to occur.

It is one advantage of the present process that it can be carried out in connection with present methods of thermally treating and canning seafoods and present canning procedures and apparatus without modification of the process except by the addition of a small amount of aluminum sulfate, so that it will be present in the can when sealed. With seafood such as certain kinds of fish which are cooked before canning, the aluminum sulfate can be added to the cooked food either in the can or prior to filling the can, alone or together with salt or brine, or fresh water, where this is desirable.

The seafood can be prepared for canning in the customary manner and the cans can be sealed and autoclaved or sterilized or pasteurized in accordance with common procedures. Referring to the canning of seafood, we refer to the packing in sealed containers, which may be of glass or other material as well as metal, and which may vary in size with different kinds of seafood or even with the same kind of seafood.

The packed cans or other containers are with advantage exhausted immediately prior to sealing. This may be accomplished, for example, by mechanical evacuation or by passing the packed but unsealed containers through an exhaust chamber in which they are heated to a temperature such that the temperature in the center of the container reaches at least above 180° F. After sealing, the cans can be subjected to further heating to effect further cooking, if desired, or sterilization or pasteurization if this has not previously been accomplished during the canning process.

We have found the use of a microscope a useful method for the rapid detection of struvite crystals in seafoods. By its use, very small crystals can be detected. Minute crystals can thus be detected, which could not be detected by touch or "feel" in the mouth. Such minute crystals are not objectionable. We have observed that amounts of aluminum sulfate, which were not sufficient to prevent entirely the formation of struvite crystals, greatly modified the size and character of the struvite crystals that did form, and gave crystals so small as to be unobjectionable. In general, however, it is advantageous to use an amount which is sufficient to prevent the formation of struvite in the thermally treated seafoods.

This application is a continuation-in-part of co-pending application Ser. No. 639,187, now abandoned.

We claim:

1. The method of preventing objectionable struvite formation in the thermal treatment and canning of seafoods which are subject to the accumulation of struvite crystals after such processing, which consists of introducing into the can with the seafood and water a struvite crystal-preventing substance consisting of aluminum sulfate in amount from about 0.025% to about 0.2% by weight of aluminum sulfate $Al_2(SO_4)_3 \cdot 18H_2O$ based upon the combined weight of the seafood and water in the can.

2. The process according to claim 1 in which the aluminum sulfate is added to the can dissolved in water.

3. The process according to claim 1 in which the aluminum sulfate is added to the can in powder form.

4. The process according to claim 1 in which the aluminum sulfate is added to the can in the form of an aluminum sulfate tablet.

5. The process according to claim 1 in which a salt tablet containing the aluminum sulfate is added to the can together with the seafood and water to form a brine by dissolving the salt tablet and the aluminum sulfate contained therein.

6. The process according to claim 1 in which the amount of aluminum sulfate is approximately 0.1% of the weight of the seafood and water contained in the can.

References Cited in the file of this patent

UNITED STATES PATENTS

| | | |
|---|---|---|
| 2,027,270 | Fellers | Jan. 7, 1936 |
| 2,555,236 | Kreidl et al. | May 29, 1951 |
| 2,680,076 | Swaine | June 1, 1954 |